(12) United States Patent
Huang et al.

(10) Patent No.: US 12,439,531 B2
(45) Date of Patent: Oct. 7, 2025

(54) SYSTEM OF REDUCING ACOUSTIC ENERGY IN AN INFORMATION HANDLING SYSTEM

(71) Applicant: DELL PRODUCTS L.P., Round Rock, TX (US)

(72) Inventors: Chih-Chia Huang, Taipei (TW); Wan-Nien Chen, New Taipei (TW); Hung-Chih Chuang, Taipei (TW); Chung-Chien Wu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 17/815,172

(22) Filed: Jul. 26, 2022

(65) Prior Publication Data

US 2024/0040715 A1    Feb. 1, 2024

(51) Int. Cl.
*H05K 5/02* (2006.01)
*H05K 5/03* (2006.01)

(52) U.S. Cl.
CPC ............. *H05K 5/0204* (2013.01); *H05K 5/03* (2013.01)

(58) Field of Classification Search
CPC ........................................................ H05K 7/00
See application file for complete search history.

(56) References Cited

U.S. PATENT DOCUMENTS

2020/0068741 A1*  2/2020  Waters ...................... G06F 1/20
2021/0407549 A1* 12/2021  Niss ....................... G11B 33/142

\* cited by examiner

*Primary Examiner* — Jerry Wu
(74) *Attorney, Agent, or Firm* — McDermott Will & Schulte LLP (57) ABSTRACT

In one or more embodiments, an information handling system may include multiple fans, a chassis configured to house components of the information handling system, and at least one mat fastened to the chassis, among others. For example, the chassis may include multiple holes through the chassis. For instance, the at least one mat may cover the multiple holes. In one or more embodiments, the at least one mat and the multiple holes may be configured to reduce acoustic energy within the chassis produced by the multiple fans.

7 Claims, 5 Drawing Sheets

SYSTEM OF REDUCING ACOUSTIC ENERGY IN AN INFORMATION HANDLING SYSTEM

BACKGROUND

Field of the Disclosure

This disclosure relates generally to information handling systems and more particularly to reducing acoustic energy in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, an information handling system may include: at least one processor; a memory medium, coupled to the at least one processor, that stores an operating system and at least one application executable by the at least one processor; multiple fans; a chassis configured to house components of the information handling system; and at least one mat fastened to the chassis. In one or more embodiments, the chassis may include multiple holes through the chassis. For example, the at least one mat may cover the multiple holes. For instance, the at least one mat and the multiple holes may be configured to reduce acoustic energy within the chassis produced by the multiple fans.

In one or more embodiments, a lid of the chassis may include a first portion of the multiple holes. For example, a body of the chassis may include a bottom wall, a first sidewall, a second sidewall, a front sidewall, and a back sidewall. For instance, the bottom sidewall, the first sidewall, and the second sidewall may include a second portion of the multiple holes. In one or more embodiments, the at least one mat fastened to the chassis may include a multiple mats. In one example, a first mat of the multiple mats may be fastened to the lid of the chassis and covers the first portion of the multiple holes. In another example, a second mat of the multiple mats may be fastened to the body of the chassis and covers the second portion of the multiple holes.

In one or more embodiments, a lid of the chassis may include a first portion of the multiple holes. For example, a body of the chassis may include a bottom wall, a first sidewall, a second sidewall, a front sidewall, and a back sidewall. For instance, the bottom sidewall may include a second portion of the multiple holes. In one or more embodiments, the first sidewall may include a third portion of the multiple holes. In one or more embodiments, the second sidewall may include a fourth portion of the multiple holes. In one or more embodiments, the at least one mat fastened to the chassis may include multiple mats. In one example, a first mat of the multiple mats may be fastened to the lid of the chassis and covers the first portion of the multiple holes. In a second example, a second mat of the multiple mats may be fastened to the bottom sidewall and covers the second portion of the multiple holes. In a third example, a third mat of the multiple mats may be fastened to the first sidewall and covers the third portion of the multiple holes. In another example, a fourth mat of the multiple mats may be fastened to the second sidewall and covers the fourth portion of the multiple holes.

In one or more embodiments, the at least one mat may be configured to impede at least seventy percent (70%) air, at five pounds per square inch (PSI) of pressure or lower, from passing through the at least one mat. In one or more embodiments, the at least one mat may be configured to prevent from passing through the at least one mat. In one or more embodiments, the memory medium may include a hard disk drive. In one or more embodiments, the at least one mat may include foam rubber. In one or more embodiments, the at least one mat may include a polymer material. In one or more embodiments, the at least one mat may be fastened to the chassis via at least one adhesive. In one or more embodiments, the at least one mat may be configured to absorb a portion of sound energy generated by the multiple fans. In one or more embodiments, a chassis for an information handling system may include multiple holes through the chassis and at least one mat fastened to the chassis and covering the multiple holes. For example, the at least one mat and the multiple holes may be configured to reduce acoustic energy within the chassis produced by one or more fans of the information handling system.

In one or more embodiments, a lid of the chassis may include a first portion of the multiple holes. For example, a body of the chassis may include a bottom wall, a first sidewall, a second sidewall, a front sidewall, and a back sidewall. For instance, the bottom sidewall, the first sidewall, and the second sidewall may include a second portion of the multiple holes. In one or more embodiments, the at least one mat may include multiple mats. In one example, a first mat of the multiple mats may be fastened to the lid of the chassis and covers the first portion of the multiple holes. In another example, a second mat of the multiple mats may be fastened to the body of the chassis and covers the second portion of the multiple holes.

In one or more embodiments, a lid of the chassis may include a first portion of the multiple holes. For example, a body of the chassis may include a bottom wall, a first sidewall, a second sidewall, a front sidewall, and a back sidewall. In one instance, the bottom sidewall may include a second portion of the multiple holes. In a second instance, the first sidewall may include a third portion of the multiple holes. In another instance, the second sidewall may include a fourth portion of the multiple holes. In one or more embodiments, the at least one mat may include multiple mats. In one example, a first mat of the multiple mats may be fastened to the lid of the chassis and covers the first portion of the multiple holes. In a second example, a second mat of the multiple mats may be fastened to the bottom sidewall and covers the second portion of the multiple holes. In a third example, a third mat of the multiple mats may be fastened to the first sidewall and covers the third portion of the multiple holes. In another example, a fourth mat of the multiple mats may be fastened to the second sidewall and covers the fourth portion of the multiple holes.

In one or more embodiments, the at least one mat is configured to impede at least seventy percent (70%) air, at five PSI of pressure or lower, from passing through the at least one mat. In one or more embodiments, the at least one mat is configured to prevent from passing through the at least one mat. In one or more embodiments, the at least one mat includes foam rubber. In one or more embodiments, the at least one mat includes a polymer material. In one or more embodiments, the at least one mat may be fastened to the chassis via at least one adhesive. In one or more embodiments, the at least one mat may be configured to absorb a portion of sound energy generated by multiple fans. In one or more embodiments, the chassis was molded with the multiple holes.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a non-volatile memory medium may be sensitive to external acoustic energy and/or external mechanical vibrations. For example, a hard disk drive (HDD) may be sensitive to external acoustic energy and/or external mechanical vibrations. For instance, the external acoustic energy and/or external mechanical vibrations may cause one or more performance losses of the HDD. As an example, one or more air moving devices (e.g., fans) and/or one or more thermal management systems (e.g., pumps, pipes, etc.) of an information handling system may cause the external acoustic energy and/or external mechanical vibrations.

In one or more embodiments, an information handling system may be configured to minimize the external acoustic energy and/or external mechanical vibrations from the one or more air moving devices and/or the one or more thermal management systems. For example, one or more upper thresholds may be applied to the one or more air moving devices and/or the one or more thermal management systems. For instance, when the one or more upper thresholds are applied to the one or more air moving devices and/or the one or more thermal management systems, the information handling system may not operate at peak capacity. As an example, an information processing capability of the information handling system may be less than a full potential when the one or more upper thresholds are applied to the one or more air moving devices and/or the one or more thermal management systems. For instance, a clock speed of a processor of the information handling system may be reduced to reduce activity of the one or more air moving devices and/or the one or more thermal management systems. In one or more embodiments, curtailing the information processing capability of the information handling system may be too restrictive for one or more information processing applications.

In one or more embodiments, acoustic energy (e.g., sound energy) may be dissipated through openings in a chassis of an information handling system, which may reduce reflected acoustic energy within the chassis. For example, a structure that includes openings (e.g., holes) in the chassis and sound absorption material covering the openings may reduce and/or dissipate acoustic energy within the chassis. In one instance, when acoustic energy within the chassis is reduced and/or dissipated, one or more fans may operate at full capacity. In another instance, when acoustic energy within the chassis is reduced and/or dissipated, errors from one or more hard disk drives (HDDs) may be reduced and/or eliminated. In one or more embodiments, when one or more fans may operate at full capacity, an information handling system may process more information. In one or more embodiments, when errors from one or more HDDs may be reduced and/or eliminated, an information handling system may process more information. In one or more embodiments, when one or more fans may operate at full capacity, one or more processors of an information handling system may operate at higher clock frequencies, which may process more information in a time period.

Figure 1:
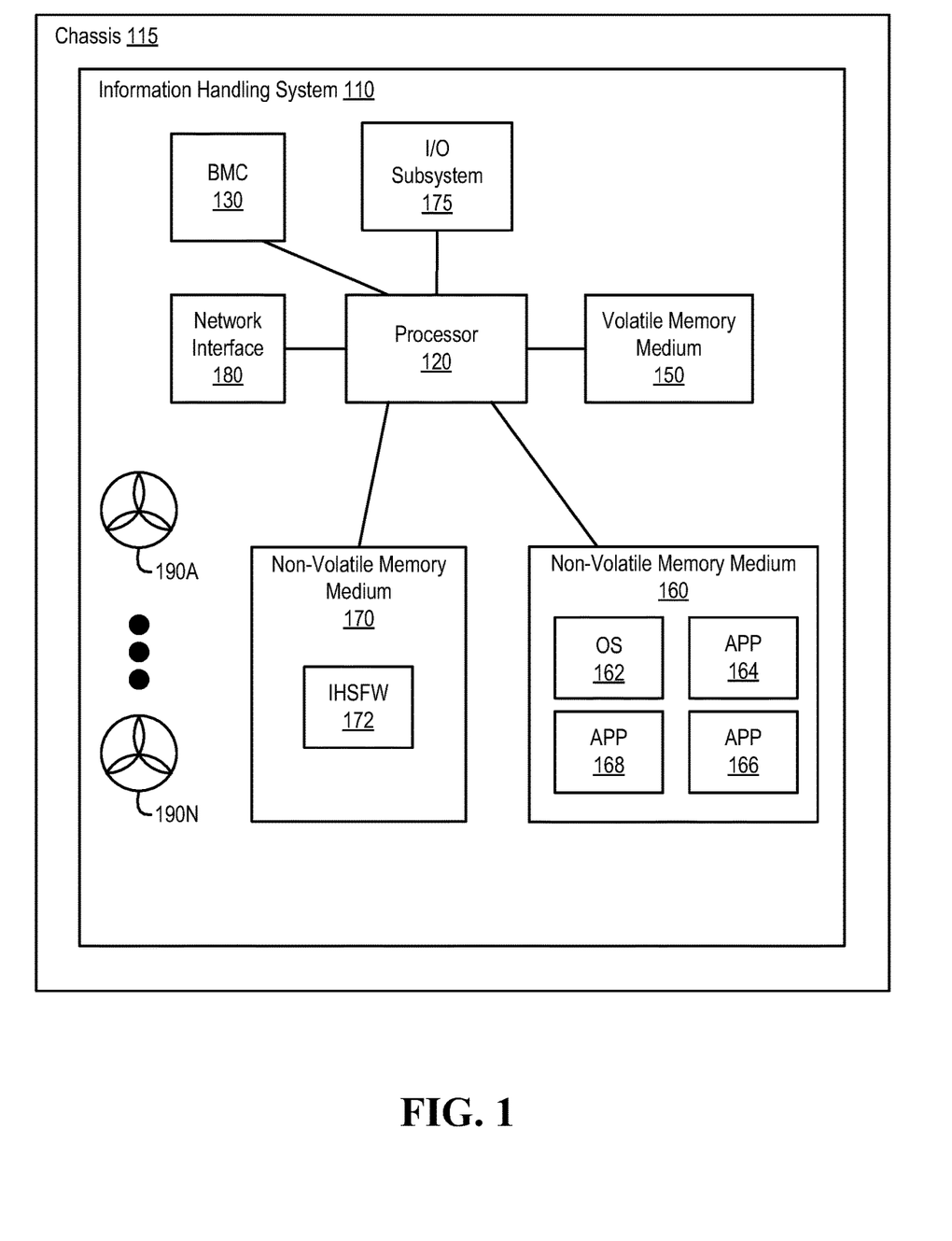
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

In one or more embodiments, IHS 110 may include a chassis 115. For example, chassis 115 may house IHS 110. In one or more embodiments, IHS 110 may include a processor 120, a baseboard management controller (BMC) 130, a volatile memory medium 150, non-volatile memory media 160 and 170, an I/O subsystem 175, and a network interface 180. For example, BMC 130, volatile memory medium 150, non-volatile memory media 160 and 170, I/O subsystem 175, and network interface 180 may be communicatively coupled to processor 120.

In one or more embodiments, an information handling system may include one or more fans. For example, IHS 110 may include fans 190A-190N. Although IHS 110 is illustrated as including fans 190A-190N, IHS 110 may include any number of fans 190, according to one or more embodiments. In one or more embodiments, a fan 190 may move air. In one example, a fan 190 may move air within IHS 110. In a second example, a fan 190 may move air into IHS 110, may intake air into IHS 110, and/or may bring air into IHS 110. In another example, a fan 190 may move air out of IHS 110, may remove air from IHS 110, and/or may expel air from IHS 110. In one or more embodiments, BMC 130 may control one or more of fans 190A-190C. For example, BMC 130 may provide control information to a fan controller (not specifically illustrated), which may control one or more of fans 190A-190C. For instance, BMC 130 may provide control information to the fan controller via a SMBus. In one or more embodiments, a fan 190 may generate one or more sounds and/or one or more vibrations as fan 190 operates to move air. In one or more embodiments, the one or more sounds the fan 190 generates may be quantified as one or more sound pressure levels.

In one or more embodiments, chassis 115 may house one or more components of IHS 110. For example, the one or more components of IHS 110 may include one or more of processor 120, BMC 130, volatile memory medium 150, non-volatile memory media 160 and 170, I/O subsystem 175, and network interface 180, among others.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, a HDD (e.g., a hard disk, a hard drive, etc.) may be or include an electro-mechanical data storage device. For example, the HDD may store and may retrieve digital data using magnetic storage via one or more rigid rotating platters, which may be coated with magnetic material. For instance, the platters may be associated with one or more magnetic heads, which may be arranged on a movable actuator arm. As an example, the one or more magnetic heads may read data from and write data to the platter surfaces. In one or more embodiments, data may be accessed in a random-access manner, which may include accessing individual blocks of data that may be stored and retrieved in any order. In one or more embodiments, a HDD may be a type of a non-volatile memory medium, which can retain stored data even when powered off and/or when power is removed from the HDD. In one or more embodiments, a non-volatile memory medium 160 may include a HDD.

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 2A:
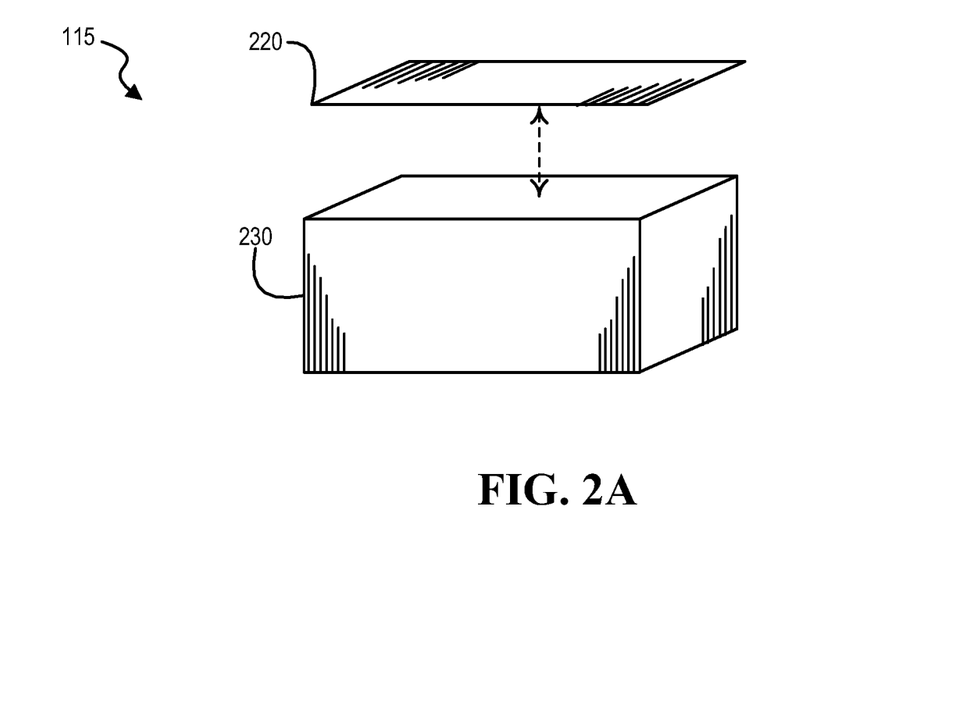
FIG. 2A illustrates an example of a chassis of an information handling system, according to one or more embodiments.

Turning now to FIG. 2A, an example of a chassis of an information handling system is illustrated, according to one or more embodiments. In one or more embodiments, chassis 115 may include a first portion 220 and a second portion 230. In one example, chassis portion 220 may be a lid of chassis 115. In another example, chassis portion 230 may be a chassis body of chassis 115. In one instance, chassis portion 230 may house a motherboard of IHS 110. In another instance, chassis portion 230 may house one or more components of IHS 110. As an example, the one or more components of IHS 110 may include one or more of a motherboard, processor 120, BMC 130, volatile memory medium 150, non-volatile memory media 160 and 170, I/O subsystem 175, network interface 180, and fans 190A-190N, among others. In one or more embodiments, chassis portion 230 may include a bottom wall, a first sidewall, a second sidewall, a front sidewall, and a back sidewall wall. For example, when chassis portion 220 is placed or affixed to the first sidewall of chassis portion 230, the second sidewall of chassis portion 230, the front sidewall of chassis portion 230, and the back sidewall of chassis portion 230, chassis portion 220 may form a top wall of chassis 115. In one or more embodiments, chassis portion 220 may be removed from chassis portion 230 to service, to repair, to remove a component from, and/or to add a component to IHS 110. For example, chassis portion 220 may be replaced to chassis portion 230.

Figure 2B:
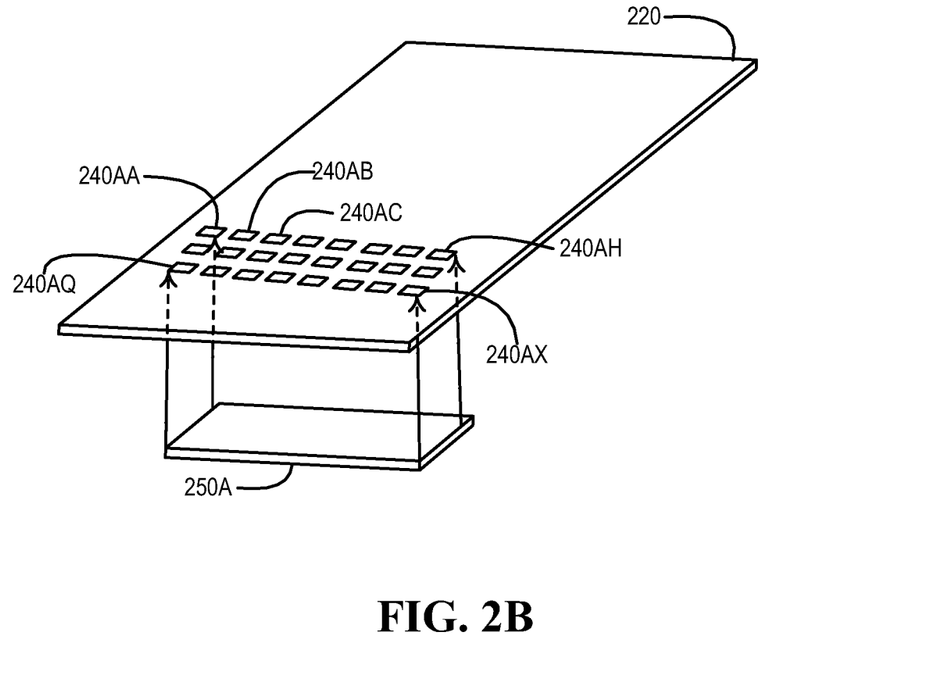
FIG. 2B illustrates an example of a lid of a chassis of an information handling system, according to one or more embodiments.

Turning now to FIG. 2B, an example of a lid of a chassis of an information handling system is illustrated, according to one or more embodiments. In one or more embodiments, chassis lid 220 may include holes 240AA-240AX. For example, holes 240AA-240AX may permit air and sounds to pass through. Although holes 240AA-240AX are illustrated, chassis lid 220 may include any number of holes 240, according to one or more embodiments. In one or more embodiments, a mat 250A may be fastened to chassis lid 220. In one example, mat 250A may be fastened to chassis lid 220 via one or more fasteners. In another example, mat 250A may be fastened to chassis lid 220 via one or more adhesives. In one or more embodiments, mat 250A may cover any number of holes 240. For example, mat 250A may cover holes 240AA-240AX.

In one or more embodiments, a mat 250 (e.g., a pad) may prevent air from passing through. For example, mat 250 may include one or more polymers that may prevent air from passing through. In one or more embodiments, a mat 250 may impede air from passing through. For example, mat 250 may impede seventy percent (70%) to ninety-nine percent (99%) of air from passing through. In one instance, mat 250 may include one or more polymers that may impede air from passing through. In another instance, mat 250 may include one or more foams that may impede air from passing through. As an example, mat 250 may include one or more foam rubbers that may impede air from passing through.

In one or more embodiments, foam rubber (which may be also known as expanded rubber, sponge, or cellular) may refer to a polymer that has been manufactured with a foaming agent that creates an air-filled matrix structure or matrix-like structure. In one example, foam rubbers may be made of synthetic rubber, natural latex, and/or polyurethane, among others. In another example, polyurethane may be a thermosetting polymer, which may be from a combination of Methyl di-isocyanate and polyethylene and other chemical additives. In one or more embodiments, rates of polymerization in foam rubber may range from tens of minutes to a few seconds. In one example, fast reacting polymers may feature short cycle periods and may need use of machinery to thoroughly mix reacting agents. In another example, slow polymers may be mixed by hand but may need long periods on mixing. In one or more embodiments, processes of manufacturing foam rubber may range from a variety of techniques, which may include spraying, open pouring, and/or molding, among others. In one or more embodiments, properties of foam rubber may include one or more of lightweight, cushioning performance, buoyant, thermal insulation, acoustic insulation, and impact damping, among others.

In one or more embodiments, a mat 250 may permit sounds to pass through. For example, a mat 250 may permit sounds of one or more air moving devices (e.g., fans) and/or one or more thermal management systems (e.g., pumps, pipes, etc.) of an information handling system to pass through. In one or more embodiments, as sounds pass through a mat 250, the sounds may be attenuated. For example, a first sound pressure level (SPL) associated with the one or more air moving devices and/or the one or more thermal management systems measured within IHS 110 may be greater than a second SPL associated with the one or more air moving devices and/or the one or more thermal management systems measured outside IHS 110.

In one or more embodiments, a mat 250 and one or more holes 240 may not reflect sounds (e.g., acoustic energy) associated with the one or more air moving devices and/or the one or more thermal management systems. In one example, mat 250 may dampen the sounds associated with the one or more air moving devices and/or the one or more thermal management systems. In a second example, mat 250 may permit the sounds associated with the one or more air moving devices and/or the one or more thermal management systems to pass through mat 250. In another example, the one or more holes 240 may permit the sounds associated with the one or more air moving devices and/or the one or more thermal management systems to pass through the one or more holes 240.

Figure 2C:
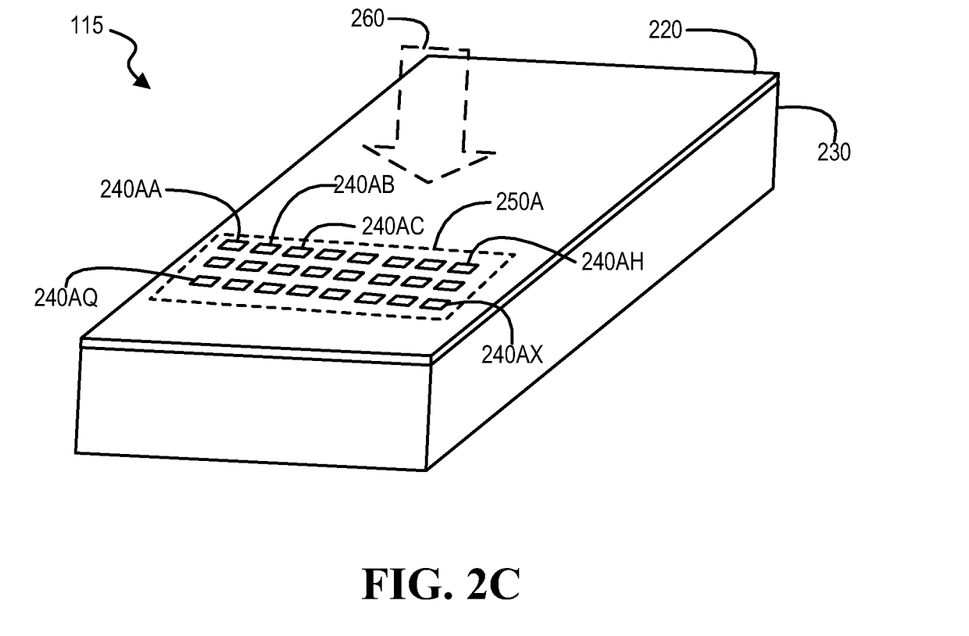
FIG. 2C illustrates an example of blocking air from entering a chassis via one or more holes of a chassis, according to one or more embodiments.
Figure 2D:
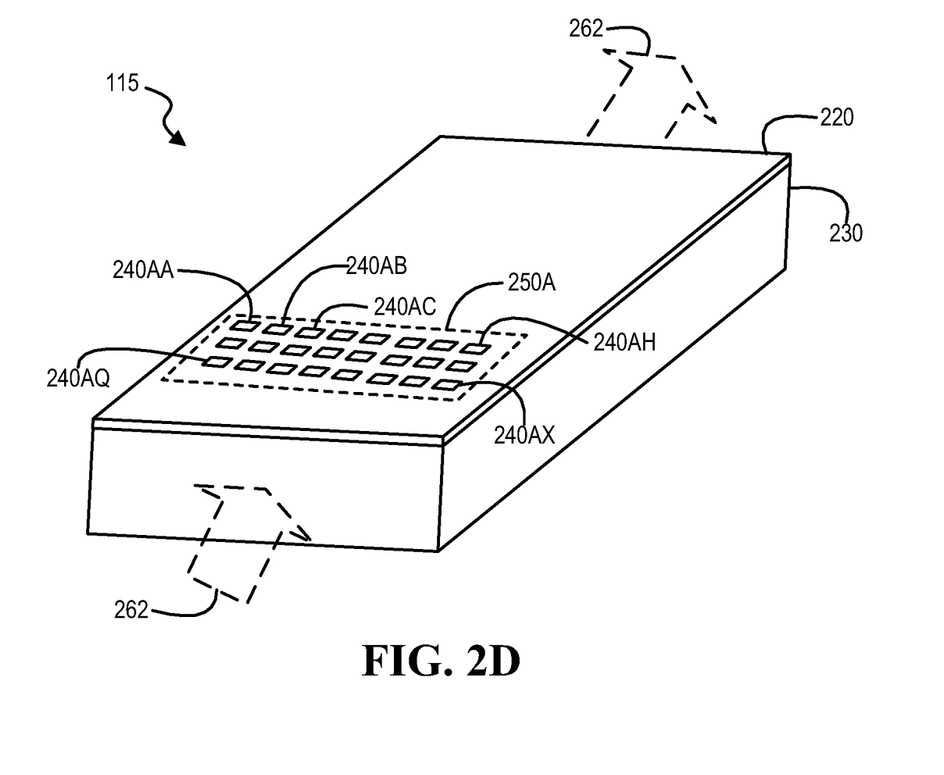
FIG. 2D illustrates an example of blocking air passing through a chassis from exiting the chassis through a mat 250 and one or more holes of the chassis, according to one or more embodiments.

In one or more embodiments, mat 250 and one or more holes 240 may permit at least a portion of the sounds associated with the one or more air moving devices and/or the one or more thermal management systems to pass through while blocking air from moving through mat 250 and one or more holes 240. In one example, mat 250 and one or more holes 240 may permit at least a portion of the sounds associated with the one or more air moving devices and/or the one or more thermal management systems to pass through while blocking air at a higher temperature than air within chassis 115 from entering chassis 115 through mat 250 and one or more holes 240. For instance, mat 250 and one or more holes 240 may permit at least a portion of the sounds associated with the one or more air moving devices and/or the one or more thermal management systems to pass through while blocking air 260 at a higher temperature than air within chassis 115 from entering chassis 115 through mat 250 and one or more holes 240, as shown in FIG. 2C. In another example, mat 250 and one or more holes 240 may permit at least a portion of the sounds associated with the one or more air moving devices and/or the one or more thermal management systems to pass through while blocking air moving within chassis 115 from exiting chassis 115 through mat 250 and one or more holes 240. For instance, mat 250 and one or more holes 240 may permit at least a portion of the sounds associated with the one or more air moving devices and/or the one or more thermal management systems to pass through while blocking air 262 passing through chassis 115 from exiting chassis 115 through mat 250 and one or more holes 240, as illustrated in FIG. 2D.

In one or more embodiments, one or more holes 240 may be located anywhere in lid 220. For example, one or more fans 190 may be located near and/or proximate to one or more holes 240 of lid 220. In one instance, one or more fans 190 may be located within ten centimeters (10 cm) of one or more holes 240 of lid 220. In another instance, one or more fans 190 may be located within twenty centimeters (20 cm) of one or more holes 240 of lid 220. In one or more embodiments, utilizing one or more holes 240 with a mat 250 may reduce a thickness of mat 250. In one example, utilizing one or more holes 240 with a mat 250 may reduce a thickness of mat 250 from ten millimeters (10 mm) to eight millimeters (8 mm). In another example, utilizing one or more holes 240 with a mat 250 may reduce a thickness of mat 250 from ten millimeters (10 mm) to seven millimeters (7 mm).

Figure 2E:
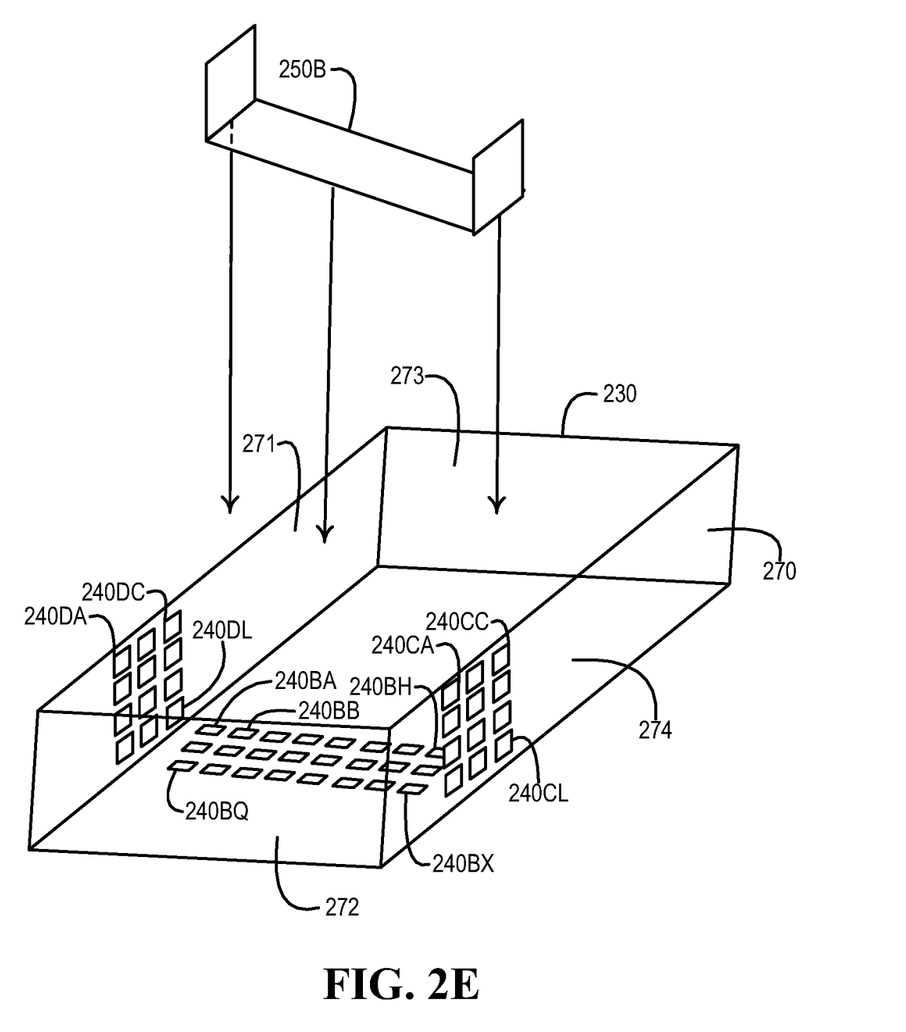
FIG. 2E illustrates an example of a body of a chassis of an information handling system, according to one or more embodiments.

Turning now to FIG. 2E, an example of a body of a chassis of an information handling system is illustrated, according to one or more embodiments. In one or more embodiments, chassis body 230 may include holes 240BA-240BX. For example, holes 240BA-240BX may permit air and sounds to pass through. Although holes 40BA-240BX are illustrated, chassis body 230 may include any number of holes 240, according to one or more embodiments. In one or more embodiments, chassis body 230 may include holes 240CA-240CL. For example, holes 240CA-240CL may permit air and sounds to pass through. Although holes 240CA-240CL are illustrated, chassis body 230 may include any number of holes 240, according to one or more embodiments. In one or more embodiments, chassis body 230 may include holes 240DA-240DL. For example, holes 240DA-240DL may permit air and sounds to pass through. Although holes 240DA-240DL are illustrated, chassis body 230 may include any number of holes 240, according to one or more embodiments.

In one or more embodiments, a mat 250B may be fastened to chassis body 230. In one example, mat 250B may be fastened to chassis body 230 via one or more fasteners. In another example, mat 250B may be fastened to chassis body 230 via one or more adhesives. In one or more embodiments, mat 250B may cover any number of holes 240. In one example, mat 250B may cover holes 240BA-240BX. In a second example, mat 250B may cover any number of holes 240. In a second example, mat 250B may cover holes 240CA-240CL. In another example, mat 250B may cover holes 240DA-240DL. In one or more embodiments, mat 250B may be a single mat.

In one or more embodiments, one or more holes 240 may be located anywhere in chassis body 230. For example, one or more fans 190 may be located near and/or proximate to one or more holes 240 of chassis body 230. In one instance, one or more fans 190 may be located within ten centimeters (10 cm) of one or more holes 240 of chassis body 230. In another instance, one or more fans 190 may be located within twenty centimeters (20 cm) of one or more holes 240 of chassis body 230.

In one or more embodiments, chassis body 230 may include a first sidewall 270, a second sidewall 271, a front sidewall 272, a back sidewall 273, and a bottom sidewall 274. In one example, first sidewall 270 may include holes 240CA-240CL. In a second example, second sidewall 271 may include holes 240DA-240DL. In a third example, bottom sidewall 274 may include holes 240BA-240BX.

Figure 2F:
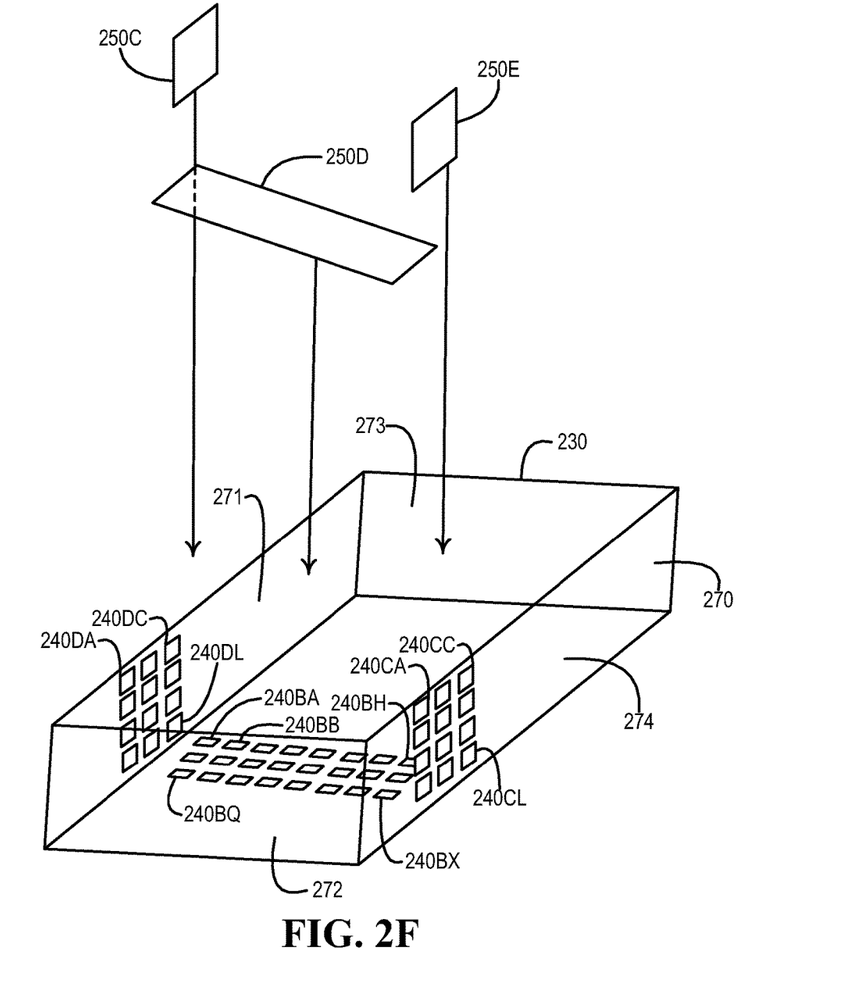
FIG. 2F illustrates another example of a body of a chassis of an information handling system, according to one or more embodiments.

Turning now to FIG. 2F, another example of a body of a chassis of an information handling system is illustrated, according to one or more embodiments. In one or more embodiments, chassis body 230 may include holes 240BA-240BX. For example, holes 240BA-240BX may permit air and sounds to pass through. Although holes 40BA-240BX are illustrated, chassis body 230 may include any number of holes 240, according to one or more embodiments. In one or more embodiments, chassis body 230 may include holes 240CA-240CL. For example, holes 240CA-240CL may permit air and sounds to pass through. Although holes 240CA-240CL are illustrated, chassis body 230 may include any number of holes 240, according to one or more embodiments. In one or more embodiments, chassis body 230 may include holes 240DA-240DL. For example, holes 240DA-240DL may permit air and sounds to pass through. Although holes 240DA-240DL are illustrated, chassis body 230 may include any number of holes 240, according to one or more embodiments.

In one or more embodiments, a mat 250C may be fastened to chassis body 230. In one example, mat 250C may be fastened to chassis body 230 via one or more fasteners. In another example, mat 250C may be fastened to chassis body 230 via one or more adhesives. In one or more embodiments, mat 250C may cover any number of holes 240. For example, mat 250C may cover holes 240DA-240DL. For instance, mat 250C may be a single mat.

In one or more embodiments, a mat 250D may be fastened to chassis body 230. In one example, mat 250D may be fastened to chassis body 230 via one or more fasteners. In another example, mat 250D may be fastened to chassis body 230 via one or more adhesives. In one or more embodiments, mat 250D may cover any number of holes 240. For example, mat 250D may cover holes 240BA-240BX. For instance, mat 250D may be a single mat.

In one or more embodiments, a mat 250E may be fastened to chassis body 230. In one example, mat 250E may be fastened to chassis body 230 via one or more fasteners. In another example, mat 250E may be fastened to chassis body 230 via one or more adhesives. In one or more embodiments, mat 250E may cover any number of holes 240. For example, mat 250E may cover holes 240CA-240CL. For instance, mat 250E may be a single mat.

In one or more embodiments, one or more holes 240 may be located anywhere in chassis body 230. For example, one or more fans 190 may be located near and/or proximate to one or more holes 240 of chassis body 230. In one instance, one or more fans 190 may be located within ten centimeters (10 cm) of one or more holes 240 of chassis body 230. In another instance, one or more fans 190 may be located within twenty centimeters (20 cm) of one or more holes 240 of chassis body 230.

In one or more embodiments, utilizing one or more holes 240 with a mat 250 may reduce a thickness of mat 250. In one example, utilizing one or more holes 240 with a mat 250 may reduce a thickness of mat 250 from ten millimeters (10 mm) to eight millimeters (8 mm). In one example, utilizing one or more holes 240 with a mat 250 may reduce a thickness of mat 250 from ten millimeters (10 mm) to seven millimeters (7 mm).

Figure 3:
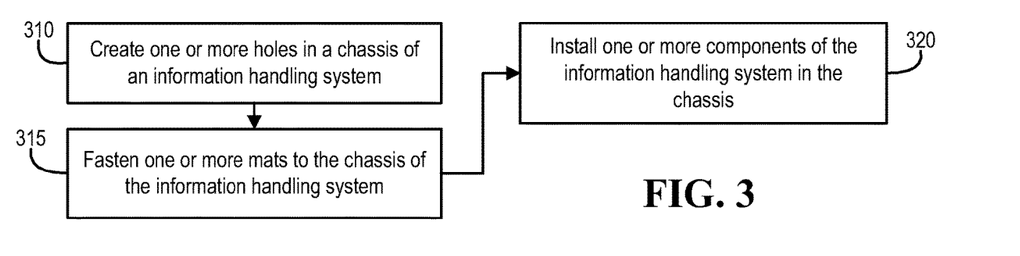
FIG. 3 illustrates an example of a method of fabricating a chassis of an information handling system, according to one or more embodiments.

Turning now to FIG. 3, an example of a method of fabricating a chassis of an information handling system is illustrated, according to one or more embodiments. At 310, one or more holes may be created in a chassis of an information handling system. In one example, one or more holes may be pierced (e.g., cut, punched, broached, etc.) in a chassis of an information handling system. In one instance, one or more holes 240 may be pierced in lid 220. In another instance, one or more holes 240 may be pierced in chassis body 230. In a second example, one or more holes may be formed in a chassis of an information handling system with a rotating bit. For instance, one or more holes may be formed in a chassis of an information handling system with a rotating bit of a computer numerical control (CNC) machine. In another example, one or more holes may be molded in a chassis of an information handling system. In one instance, one or more holes 240 may be molded in lid 220. In another instance, one or more holes may be molded in chassis body 230.

In one or more embodiments, a hole 240 may be any shape. For example, a hole 240 may be a square, a rectangle, a circle, a triangle, a pentagon, a hexagon, or an octagon, among others. In one or more embodiments, multiple holes 240 may be multiple different shapes. In one or more embodiments, one or more portions 220 and 230 of chassis 115 may be molded. In one example, the one or more portions 220 and 230 of chassis 115 may be molded from a polymer material. For instance, the one or more portions 220 and 230 of chassis 115 may be molded via a plastic injection molding process. In another example, the one or more portions 220 and 230 of chassis 115 may be molded from a metallic material. For instance, the one or more portions 220 and 230 of chassis 115 may be molded via a metal injection molding process.

At 315, one or more mats may be fastened to the chassis of the information handling system. In one example, mat 250A may be fastened to chassis lid 220. For instance, mat 250A may be fastened to chassis lid 220 to cover one or more holes 240 of chassis lid 220. In a second example, mat 250B may be fastened to chassis body 230. For instance, mat 250B may be fastened to chassis body 230 to cover one or more holes 240 of chassis body 230. In another example, mats 250C-250E may be fastened to chassis body 230. For instance, mats 250C-250E may be fastened to chassis body 230 to cover one or more holes 240 of chassis body 230. In one or more embodiments, a mat 250 may be fastened on an interior of chassis 115. In one or more embodiments, a mat 250 may be fastened on an exterior of chassis 115.

At 320, one or more components of the information handling system may be installed in the chassis. For example, one or more components of IHS 110 may be installed in chassis 115. For instance, the one or more components of IHS 110 may be installed in chassis body 230 of chassis 115. As an example, the one or more components of IHS 110 may include one or more of processor 120, BMC 130, volatile memory medium 150, non-volatile memory media 160 and 170, I/O subsystem 175, network interface 180, fans 190A-90N, and a motherboard, among others.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
    at least one processor;
    a memory medium, coupled to the at least one processor, that stores an operating system and at least one application executable by the at least one processor;
    a plurality of fans;
    a chassis configured to house components of the information handling system, the chassis including:
        a lid; and
        a body including a bottom sidewall, a first sidewall, a second sidewall, a front sidewall, and a back sidewall,
        wherein the chassis includes a plurality of holes through the chassis,
        wherein the lid includes a first subset of holes of the plurality of holes, wherein the bottom sidewall includes a second subset of holes of the plurality of holes,
        wherein the first sidewall includes a third subset of holes of the plurality of holes,
        wherein the second sidewall includes a fourth subset of holes of the plurality of holes; and
    a plurality of mats fastened to the chassis via at least one adhesive;
    wherein the plurality of mats cover the plurality of holes and is in direct contact with the plurality of holes such that the plurality of mats cover are directly adjacent to the plurality of holes,
    wherein a first mat of the plurality of mats is fastened to the lid of the chassis and covers the first set of holes of the plurality of holes,
    wherein a second mat of the plurality of mats is a single mat and fastened to the first, second, and bottom sidewalls and covers the second, third, and fourth sets of holes of the plurality of holes,
    wherein the plurality of mats and the plurality of holes are configured to reduce reflected acoustic energy within the chassis produced by the plurality of fans.

2. The information handling system of claim 1, wherein the plurality of mats are configured to impede at least seventy percent (70%) air, at five pounds per square inch (PSI) of pressure or lower, from passing through the at least one mat.

3. The information handling system of claim 1, wherein the plurality of mats are configured to prevent air from passing through the plurality of holes.

4. The information handling system of claim 1, wherein the memory medium includes a hard disk drive.

5. The information handling system of claim 1, wherein the plurality of mats include foam rubber.

6. The information handling system of claim 1, wherein the plurality of mats include a polymer material.

7. The information handling system of claim 1, wherein the plurality of mats are configured to absorb a portion of sound energy generated by the plurality of fans.

* * * * *